(12) United States Patent
McCarthy et al.

(10) Patent No.: US 8,546,286 B2
(45) Date of Patent: Oct. 1, 2013

(54) PREPARATION OF HYDROGENATION AND DEHYDROGENATION CATALYSTS

(75) Inventors: Stephen J. McCarthy, Center Valley, PA (US); Jean W. Beeckman, Columbia, MD (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 780 days.

(21) Appl. No.: 12/653,511

(22) Filed: Dec. 15, 2009

(65) Prior Publication Data
US 2011/0139685 A1    Jun. 16, 2011

(51) Int. Cl.
*B01J 29/06* (2006.01)
*B01J 33/00* (2006.01)

(52) U.S. Cl.
USPC ........ 502/60; 502/1; 502/63; 502/64; 502/66; 502/71; 502/74; 502/75; 502/85

(58) Field of Classification Search
USPC ............... 502/1, 60, 63, 64, 66, 69, 71, 74, 502/75, 85
See application file for complete search history.

(56) References Cited

U.S. PATENT DOCUMENTS

| | | | | |
|---|---|---|---|---|
| 4,654,317 A | * | 3/1987 | Sachtler et al. | 502/74 |
| 5,041,401 A | * | 8/1991 | Schoennagel et al. | 502/61 |
| 5,244,852 A | * | 9/1993 | Lachman et al. | 502/66 |
| 5,292,991 A | * | 3/1994 | Lachman et al. | 585/850 |
| 5,384,296 A | * | 1/1995 | Tsao | 502/66 |
| 5,439,859 A | * | 8/1995 | Durante et al. | 502/66 |
| 5,925,330 A | * | 7/1999 | Roth | 423/702 |
| 6,759,360 B2 | * | 7/2004 | Wang et al. | 502/85 |
| 7,045,481 B1 | * | 5/2006 | Parasher et al. | 502/150 |
| 7,074,739 B2 | * | 7/2006 | Dakka et al. | 502/214 |
| 7,332,148 B2 | * | 2/2008 | Tran et al. | 423/700 |
| 7,332,454 B2 | * | 2/2008 | Dang et al. | 502/60 |
| 2006/0211569 A1 | * | 9/2006 | Dang et al. | 502/60 |
| 2007/0227351 A1 | * | 10/2007 | Garcia-Martinez | 95/90 |
| 2008/0171649 A1 | * | 7/2008 | Jan et al. | 502/64 |
| 2009/0177021 A1 | * | 7/2009 | Reynolds et al. | 585/468 |

FOREIGN PATENT DOCUMENTS

| | | |
|---|---|---|
| EP | 0449485 | 5/1997 |
| WO | 0245851 | 6/2002 |

OTHER PUBLICATIONS

Clark et al., "Catalysis of liquid phase organic reactions using chemically modified mesoporous inorganic solids", J. Chem. Commun. pp. 853-860, 1998.*

* cited by examiner

*Primary Examiner* — Elizabeth Wood
(74) *Attorney, Agent, or Firm* — Liza Montalvo; David Weisberg

(57) ABSTRACT

In a process for producing a metal containing catalyst composition suitable for effecting hydrocarbon hydrogenation and/or dehydrogenation reactions, a catalyst support comprising a porous crystalline material combined with an amorphous binder is treated with an anchoring material capable of bonding to the surface of the support and to a metal component. In addition, a precursor to the metal component is deposited on the surface of the catalyst support and then the treated catalyst support having the precursor deposited thereon is subjected to conditions effective to convert the precursor to the metal component and to cause the anchoring material to bond to the surface of the support and to the metal component.

12 Claims, 1 Drawing Sheet

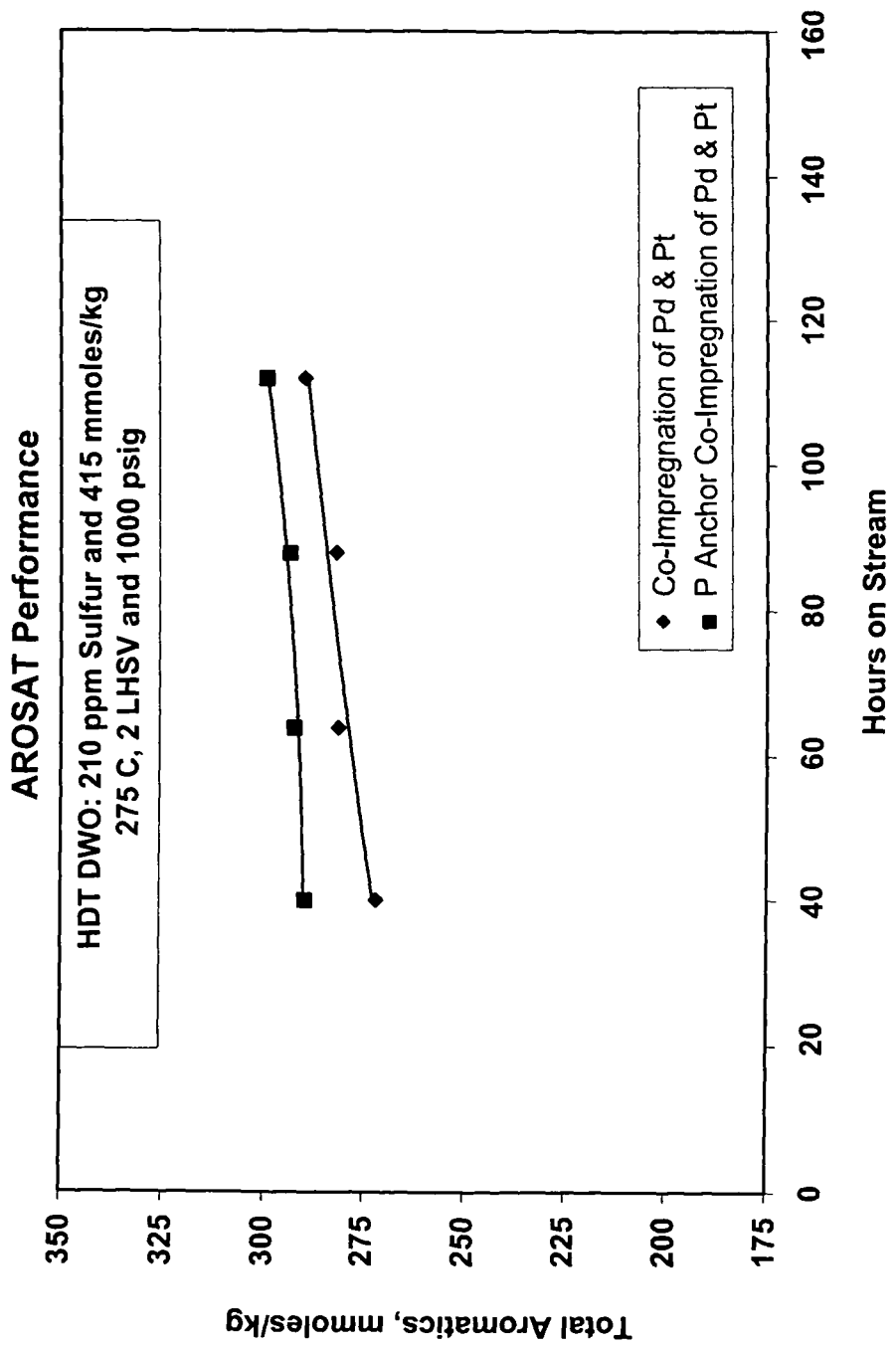

US 8,546,286 B2

PREPARATION OF HYDROGENATION AND DEHYDROGENATION CATALYSTS

FIELD

The present invention relates to preparation of catalysts suitable for effecting hydrogenation and/or dehydrogenation reactions.

BACKGROUND

Hydrogenation and dehydrogenation of hydrocarbons are important reactions in the refining and petrochemical industries. Non-limiting examples of such reactions include reforming, dewaxing, hydrocracking, hydrotreating and hydrofinishing. Many such reactions employ a catalyst comprising a noble metal component deposited on a support composed of a porous crystalline material combined with an amorphous binder.

Currently, most noble metal catalysts are made by impregnating platinum and/or palladium complexes onto the catalyst support. The catalyst is then dried to remove water and calcined in air to decompose the metal complexes leaving behind highly dispersed platinum and/or palladium oxides on the support surface. The catalyst is then activated by reducing the noble metal oxides in the presence of hydrogen to produce active platinum and palladium sites. However, during both catalyst activation (particularly in the presence of water vapor) and on-stream operation, the catalytic activity declines due to metal sintering which occurs when finely dispersed platinum and palladium particles agglomerate and the active metals surface is reduced.

The present invention seeks to address this problem by providing a novel method of adding noble metal anchors onto the surface of the catalyst support via pre-treatment and thereby reducing the propensity for metal sintering and significantly improving catalyst stability. While improving stability, adding noble metal anchors appears to have no measurable negative effect on initial catalyst activity or selectivity.

U.S. Pat. No. 5,041,401 discloses a zeolite catalyst composition comprising (a) a zeolite component, (b), a non-framework multivalent metal oxide component occupying the pores of the zeolite, said non-framework multivalent metal oxide being incorporated into the pores of the zeolite component by a method which includes calcining at a temperature of at least about 600° C. in an atmosphere containing from about 1 to 100 parts per million of water, and (c) a noble metal component. The presence of the metal oxide component (b) is said to impart significantly increased resistance to agglomeration and/or migration of the noble metal component (c) in operation, but incorporating the metal oxide in the pores of the zeolite is expected to change the activity and selectivity of the finished catalyst.

In an article entitled "Effect of aluminum modification on catalytic performance of Pt supported on MCM-41 for thiophene hydrosulfurization" in Applied Catalysis A: General 308 (2006), pages 111-118, Kanda et al. disclose that alumina modification of MCM-41 improves the Pt dispersion and catalytic activity of a Pt/MCM-41 hydrodesulfurization catalyst. There is, however, no disclosure or suggestion in this article that aluminum modification would increase the agglomeration resistance of a noble metal deposited on a bound MCM-41 catalyst.

SUMMARY

In one aspect, the invention resides in a process for producing a metal-containing catalyst composition suitable for effecting hydrocarbon hydrogenation and/or dehydrogenation reactions, the process comprising:

(a) providing a catalyst support comprising a porous crystalline material combined with a substantially amorphous binder;

(b) treating the catalyst support with an anchoring material capable of bonding to the surface of the support and to a metal component;

(c) depositing a precursor to said metal component on the surface of the catalyst support; and then (d) subjecting the treated catalyst support having said precursor deposited thereon to conditions effective to convert said precursor to the metal component and to cause said anchoring material to bond to the surface of the support and to the metal component.

Conveniently, the porous crystalline material is a silicate or an aluminosilicate.

In one embodiment, the porous crystalline material is a mesoporous material, such as a mesoporous material is selected from the group consisting of MCM-41, MCM-48, MCM-50 and mixtures thereof.

Conveniently, the amorphous binder is an inorganic oxide material.

In one embodiment, the anchoring material is selected from a phosphorus oxide, a phosphorus oxyacid, a phosphorus oxyhalide and mixtures thereof.

In another embodiment, the anchoring material is a nitrate of a metal selected from Groups 4 and 13 of the Periodic Table of Elements, such as aluminum nitrate, zirconium nitrate and mixtures thereof.

Conveniently, the metal component comprises at least one metal selected from Groups 6 to 10 of the Periodic Table of Elements and compounds and mixtures thereof, such as platinum, palladium and compounds and mixtures thereof.

Conveniently, said precursor comprises a complex of said metal component and the depositing (c) is conducted by impregnation or ion exchange.

Conveniently, (d) comprises heating the treated catalyst support in an oxygen-containing atmosphere to convert the precursor to an oxide of the metal component and then heating the treated catalyst support in an hydrogen-containing atmosphere to convert the oxide to the metal component.

In further aspects, the invention resides in a metal-containing catalyst composition produced by the process described herein and to use of the catalyst composition in a method of reducing the aromatics concentration in an aromatics-containing hydrocarbon feed.

BRIEF DESCRIPTION OF THE DRAWINGS

FIG. 1 is a graph comparing the total aromatics concentration against time on stream obtained in hydrofinishing a hydrotreated 600N dewaxed oil using the Pt/Pd Si-MCM-41 catalyst of Example 1 with that obtained using the phosphoric acid co-impregnated Pt/Pd Si-MCM-41 catalyst of Example 2.

DETAILED DESCRIPTION OF THE EMBODIMENTS

Described herein is a process for producing a metal-containing catalyst composition suitable for effecting hydrocarbon hydrogenation and/or dehydrogenation reactions. The process employs a catalyst support comprising a porous crystalline material combined with an amorphous binder and initially involves treating the catalyst support with an anchoring material capable of bonding to the surface of the support and to a metal component. Simultaneously with or after treating the catalyst support with the anchoring material, a precursor to the metal component is deposited on the surface of the catalyst support. Thereafter, the treated catalyst support having the metal precursor deposited thereon is subjected to one or more heating steps under conditions effective to convert the precursor to the metal component and to cause the anchoring material to bond to the surface of the support and to the metal component. The resultant catalyst exhibits similar initial catalytic activity to, but improved metal agglomeration resistance than, the same catalyst but without the noble metal anchors.

The resulting catalyst composition can be used in a wide variety of processes involving hydrogenation and/or dehydrogenation of hydrocarbons, both aliphatic and aromatic. Suitable examples include reforming, dewaxing, hydrocracking, and hydrotreating. In particular, however, the present process is directed to the production of hydrofinishing catalysts, which are used to reduce the aromatics content of lubricants and fuels.

The catalyst support used to produce the present metal-containing catalyst composition comprises a porous crystalline material combined with a substantially amorphous binder. The porous crystalline material is generally a silicate or an aluminosilicate and, depending on the intended use of the catalyst composition, can be either a microporous material or a mesoporous material. As used herein, the term microporous is used to denote materials with pores having a diameter less than 1.5 nm and mesoporous is used to denote materials with pores having a diameter from 1.5 nm to 50 nm.

Examples of suitable microporous materials are zeolites, particularly those having a Constraint Index (as defined in U.S. Pat. No. 4,016,218) of about 1 to 12 and normally designated as medium pore size zeolites and those having a Constraint Index less than 1 and normally designated as large pore size zeolites.

Suitable medium pore molecular sieves include ZSM-5, ZSM-11, ZSM-12, ZSM-22, ZSM-23, ZSM-35, and ZSM-48. ZSM-5 is described in detail in U.S. Pat. Nos. 3,702,886 and Re. 29,948. ZSM-11 is described in detail in U.S. Pat. No. 3,709,979. ZSM-12 is described in U.S. Pat. No. 3,832,449. ZSM-22 is described in U.S. Pat. No. 4,556,477. ZSM-23 is described in U.S. Pat. No. 4,076,842. ZSM-35 is described in U.S. Pat. No. 4,016,245. ZSM-48 is more particularly described in U.S. Pat. No. 4,234,231. Catalyst compositions employing medium pore molecular sieves are particularly useful in reactions such as reforming and dewaxing.

Suitable large pore molecular sieves include zeolite beta, zeolite Y, Ultrastable Y (USY), Dealuminized Y (Deal Y), mordenite, ZSM-3, ZSM-4, ZSM-18, ZSM-20 and MCM-22 and its related molecular sieves. Zeolite ZSM-14 is described in U.S. Pat. No. 3,923,636. Zeolite ZSM-20 is described in U.S. Pat. No. 3,972,983. Zeolite Beta is described in U.S. Pat. No. 3,308,069, and Re. No. 28,341. Low sodium Ultrastable Y molecular sieve (USY) is described in U.S. Pat. Nos. 3,293,192 and 3,449,070. Dealuminized Y zeolite (Deal Y) may be prepared by the method found in U.S. Pat. No. 3,442,795. Zeolite UHP-Y is described in U.S. Pat. No. 4,401,556. Mordenite is a naturally occurring material but is also available in synthetic forms, such as TEA-mordenite (i.e., synthetic mordenite prepared from a reaction mixture comprising a tetraethylammonium directing agent). TEA-mordenite is disclosed in U.S. Pat. Nos. 3,766,093 and 3,894,104. MCM-22 is described in U.S. Pat. No. 4,954,325. Catalyst compositions employing large pore molecular sieves are particularly useful in reactions such as hydrocracking and hydrotreating.

Examples of suitable mesoporous materials are the M41S family of materials, whose preparation is further described in J. Amer. Chem. Soc., 1992, 114, 10834. Examples of materials within the M41S family include MCM-41, MCM-48 and MCM-50. A preferred member of this class is MCM-41 whose preparation is described in U.S. Pat. No. 5,098,684. MCM-41 is an inorganic, porous, non-layered phase having a hexagonal arrangement of uniformly-sized pores. The physical structure of MCM-41 is like a bundle of straws wherein the opening of the straws (the cell diameter of the pores) ranges from 1.5 to 10 nm. MCM-48 has a cubic symmetry and is described in U.S. Pat. No. 5,198,203, whereas MCM-50 has a lamellar structure and is described in U.S. Pat. No. 5,304,363. Catalyst compositions employing mesoporous molecular sieves are particularly useful in hydrofinishing reactions.

In the present catalyst composition, the porous crystalline material is composited with a substantially amorphous binder, which is resistant to the temperatures and other conditions experienced by the catalyst in use. Suitable binder materials include inorganic oxides such as alumina, silica, silica-alumina, zirconia, titania, magnesia or mixtures of these and other oxides. The latter may be either naturally occurring or in the form of gelatinous precipitates or gels including mixtures of silica and metal oxides. Clays may also be included with the oxide type binders to modify the mechanical properties of the catalyst or to assist in its manufacture. Use of a material in conjunction with the molecular sieve, i.e., combined therewith or present during its synthesis, which itself is catalytically active may change the conversion and/or selectivity of the catalyst. Inactive materials suitably serve as diluents to control the amount of conversion so that products may be obtained economically and orderly without employing other means for controlling the rate of reaction. These materials may be incorporated into naturally occurring clays, e.g., bentonite and kaolin, to improve the crush strength of the catalyst under commercial operating conditions and function as binders or matrices for the catalyst. The relative proportions of molecular sieve and inorganic oxide binder vary widely, with the sieve content ranging from about 1 to about 90 percent by weight and more usually in the range of about 2 to about 80 weight percent of the composite.

The present catalyst composition also includes a hydrogenation/dehydrogenation metal component, which typically comprises at least one metal selected from Groups 6 to 10 of the Periodic Table of Elements and compounds and mixtures thereof. More particularly, the hydrogenation/dehydrogenation metal component normally comprises at least one noble metal selected from Groups 8 to 10 of the Periodic Table of Elements and compounds and mixtures thereof, such as platinum, palladium and compounds and mixtures thereof. As used herein, the numbering scheme for the Periodic Table Groups is as disclosed in Chemical and Engineering News, 63(5), 27 (1985).

Typically, the hydrogenation/dehydrogenation metal component is present in the catalyst composition in an amount between about 0.2 wt % and about 3.0 wt % of the total catalyst composition, In one practical embodiment, in which the catalyst composition is intended for use in hydrofinishing lubricants and fuels, the hydrogenation/dehydrogenation metal component comprises both platinum and palladium present in amounts between about 0.1 wt % and about 1.0 wt % and between about 0.1 wt % and about 2.0 wt % respectively of the total catalyst composition.

In order to enhance its stability and to reduce the propensity for metal sintering and agglomeration during activation and operation, the present catalyst composition also includes metal anchors chemically bonded to the metal and the support. These metal anchors are believed to attach to the amorphous component of the catalyst support and apparently do not interact with the porous crystalline component since the catalyst selectivity is generally unaffected by the presence of the anchors.

The metal anchors are produced by treating the catalyst support, typically by impregnation, with an anchoring material capable of bonding to the surface of the catalyst support and to the metal component of the catalyst. Suitable anchoring materials include phosphorus oxides, phosphorus oxyacids, phosphorus oxyhalides and mixtures thereof, normally in aqueous solution. Other suitable anchoring materials include aqueous solutions of metal nitrates from Groups 4 and 13 of the Periodic Table of Elements, such as aluminum nitrate, zirconium nitrate and mixtures thereof. After or simultaneously with the treatment with the anchoring material, a precursor to the metal component of the catalyst is deposited on the surface of the catalyst support. The precursor is typically an aqueous solution of a complex of each catalyst metal, such as an amine complex, and is generally deposited on the catalyst support by impregnation or ion exchange.

After deposition of the anchoring material and the metal precursor(s) on the catalyst support, the catalyst composition is subjected to one or more heat treatment steps to convert the precursors to the required catalytically active metal component (namely to activate the catalyst) and to cause the anchoring material to bond to the surface of the catalyst support and to the metal component. Suitable heat treatment steps include (i) heating the treated catalyst support in an oxygen-containing atmosphere, such as air, to convert the metal precursor(s) to an oxide of the or each metal component and then (ii) heating the treated catalyst support in a hydrogen-containing atmosphere to convert the oxide(s) to the metal component(s). The heating (i) is typically conducted at a temperature of about 250° C. to about 350° C. for about 0.5 to about 4.0 hours, whereas the heating (ii) is typically conducted at a temperature of about 150° C. to about 300° C. for about 0.5 to about 4.0 hours.

The present catalyst composition can be used to catalyze a wide variety of hydrocarbon hydrogenation and dehydrogenation reactions including many of present commercial/industrial importance. Examples include:

(a) hydrofinishing of aromatic-containing lubricants and fuels with reaction conditions including a temperature of from about 150° C. to about 400° C., a hydrogen partial pressure of from about 740 to about 20786 kPa (100 to 3000 psig), a liquid hourly space velocity (LHSV) of from about 0.1 to about 10 hr$^{-1}$, and a hydrogen to feed ratio of from about 89 to about 1780 m$^3$/m$^3$ (500 to 10000 scf/B);

(b) dewaxing of paraffinic feeds with reaction conditions including a temperature of from about 200° C. to about 450° C., a pressure of about 0 to 1000 psig, a WHSV of about 0.2 hr$^{-1}$ to about 10 hr$^{-1}$, and a hydrogen/hydrocarbon mole ratio of about 0.5 to about 10;

(c) hydrocracking of heavy hydrocarbon fractions having an initial boiling point of at least 345° C. with reaction conditions including a temperature of from about 290° C. to about 440° C., a pressure of from about 2860 to about 10445 kPa, a liquid hourly space velocity (LHSV) from about 0.1 to about 10 hr$^{-1}$, and hydrogen circulation rate from 250 to 1000 m$^3$/m$^3$ (about 1400 to 5600 SCF/bbl); and (d) reforming of naphtha streams with reaction conditions including a temperature in the range of about 400 C to about 600 C, a pressure ranging from about atmospheric to about 40 bar, and a liquid hourly space velocity (LHSV) ranging from about 0.1 to about 15 hr$^{-1}$.

(e) hydrotreating of lubricant basestocks to reduce the level of nitrogen and/or sulfur impurities with reaction conditions including a temperature of from about 150 to 400° C., a hydrogen partial pressure of from 1480 to 20786 kPa (200 to 3000 psig), a space velocity of from 0.1 to 10 hr$^1$, and a hydrogen to feed ratio of from 89 to 1780 m$^3$/m$^3$ (500 to 10000 scf/B).

The invention will now be more particularly described with reference to the following non-limiting Examples and the accompanying drawing.

EXAMPLE 1

Base Case

About 100 grams of Si-MCM-41 bound with 35 wt % alumina were loaded into an impregnation cone. A solution containing 7.8 grams of platinum tetraamine nitrate solution (4 wt % platinum) and 25.86 grams of palladium tetraamine nitrate (3.64 wt % platinum) was diluted to 142 ml with water. The solution was sprayed onto the Si-MCM-41 support while the cone was rotated at 8 RPM. The support was then dried in air and calcined in a muffle furnace at 580° F. (304° C.) for 1 hour. The properties of the resultant catalyst are shown in Table 1.

EXAMPLE 2

Co-Impregnation of MCM-41 with Phosphoric Acid

About 100 grams of Si-MCM-41 bound with 35 wt % alumina were loaded into an impregnation cone. A solution containing 7.8 grams of platinum tetraamine nitrate solution (4 wt % platinum), 25.86 grams of palladium tetraamine nitrate (3.64 wt % platinum), and 0.23 grams of phosphoric acid was diluted to 142 ml with water. The solution was sprayed onto the Si-MCM-41 support while the cone rotated at 8 RPM. The support was then dried in air and calcined in a muffle furnace at 580° F. (304° C.) for 1 hour. The properties of the resultant catalyst are shown in Table 1.

EXAMPLE 3

Pre-Treatment with Aluminum Nitrate

About 100 grams of Si-MCM-41 bound with 35 wt % alumina were loaded into an impregnation cone. A solution was prepared by adding 7.3 grams of alumina nitrate to 142 ml of water. The solution was then sprayed onto the Si-MCM-41 support while the cone rotated at 8 RPM. The support was then dried in air and calcined in a muffle furnace at about 1000° F.). (538° for 3 hours. A second solution containing 7.8 grams of platinum tetraamine nitrate solution (4 wt % platinum) and 25.86 grams of palladium tetraamine nitrate (3.64 wt % platinum) was diluted to 142 ml with water. The solution was sprayed onto the Si-MCM-41 support while the cone rotated at 8 RPM. The support was then dried in air and calcined in a muffle furnace at 580° F. (304° C.) for 1 hour. The properties of the resultant catalyst are shown in Table 1.

EXAMPLE 4

Pre-Treatment with Zirconium Nitrate

About 100 grams of Si-MCM-41 bound with 35 wt % alumina were loaded into an impregnation cone. A solution was prepared by adding 4.8 grams of zirconium to 142 ml of water. The solution was then sprayed onto the Si-MCM-41 support while the cone rotated at 8 RPM. The support was then dried in air and calcined in a muffle furnace at about 1000° F.). (538° for 3 hours. A second solution containing 7.8 grams of platinum tetraamine nitrate solution (4 wt % platinum) and 25.86 grams of palladium tetraamine nitrate (3.64 wt % platinum) was diluted to 142 ml with water. The solution was sprayed onto the Si-MCM-41 support while the cone rotated at 8 RPM. The support then dried in air and calcined in a muffle furnace at 580° F. (304° C.) for 1 hour. The properties of the resultant catalyst are shown in Table 1.

TABLE 1

| Example | Pt, wt % | Pd, wt % | O/M*, mol/mol | BHA | Surface Area, m2/g |
|---|---|---|---|---|---|
| 1: (Base) | 0.28 | 0.85 | 0.65 | 170 | 625 |
| 2: $P_2O_5$ | 0.27 | 0.89 | 0.66 | 120 | 575 |
| 3: $Al(NO_3)_3$ | 0.27 | 0.85 | 0.60 | 110 | 585 |
| 4: $Zr(NO_3)_2$ | 0.28 | 0.84 | 0.63 | 100 | 605 |

*O/M = oxygen chemisorption (as defined below)

EXAMPLE 5

Steaming of Pt/Pd Catalysts

About 10 grams of catalyst from Examples 1 to 4 were loaded into a sample boat and placed into a quartz tube furnace at 500° F. (260° C.) in an atmosphere of 100% steam for about 3 hours. A second batch of 10 grams of catalyst from Examples 1 to 4 were loaded into a sample boat and placed into a quartz tube furnace at 800° F. (427° C.) in an atmosphere of 100% steam for about 3 hours. These steaming were used to simulate the noble metal agglomeration that would occur during start-up and on-stream operation. The loss of metal surface area was determined by oxidation chemisorption (O/M), namely the amount of oxygen that could be absorbed onto the metal surface of the steamed catalyst following reduction. The results are summarized in Table 2.

TABLE 2

| Example # | Calcined O/M, mol/mol | Steamed at 500° F. O/M, mol/mol | Steamed at 800° F. O/M, mol/mol |
|---|---|---|---|
| 1: Base | 0.65 | 0.33 | 0.16 |
| 2: $P_2O_5$ | 0.66 | 0.64 | 0.60 |
| 3: $Al(NO_3)_3$ | 0.60 | 0.58 | 0.38 |
| 4: $Zr(NO_3)_2$ | 0.63 | — | 0.44 |

As shown in Table 2, adding these noble metal anchor sites onto the Si-MCM-41/binder support surface via pre- or co-impregnation significantly reduces metal sintering and should improve catalyst stability.

EXAMPLE 6

Catalytic Performance

The performance of each the catalysts in Examples 1 and 2 was evaluated for hydrofinishing a hydrotreated 600N dewaxed oil. The dewaxed oil was previously hydrotreated to reduce the sulfur content to about 200 ppm and the total aromatics to about 415 mmoles/kg to simulate a Group II basestock. Approximately 5 cc of each catalyst were loaded into an upflow micro-reactor. About 3 cc of 80 to 120 mesh sand was added to the catalyst to ensure uniform liquid flow. After pressure testing with nitrogen and hydrogen, the catalysts were dried in nitrogen at 260° F. (127° C.) for about 3 hours, cooled to room temperature, activated in hydrogen at about 260° C. for 8 hours and then cooled to 150° C. The oil feed was fed to the reactor and the temperature was increased to 275° C. and then held constant for about 7 to 10 days. Hydrogen purity was 100% and no gas recycle was used.

Product quality as defined by aromatic, sulfur, hydrogen and nitrogen contents were monitored daily. Aromatics were measured by UV absorption (mmoles/kg). Total aromatic content as a function of time on stream are shown in FIG. 1, from which it will be seen that co-impregnating the Si-MCM-41 support with phosphoric acid during metals impregnation had no significant effect on the catalyst performance while improving the resistance of the catalyst to noble metal sintering.

While the present invention has been described and illustrated by reference to particular embodiments, those of ordinary skill in the art will appreciate that the invention lends itself to variations not necessarily illustrated herein. For this reason, then, reference should be made solely to the appended to claims for purposes of determining the true scope of the present invention.

What is claimed is:

1. A process for producing a metal containing catalyst composition suitable for effecting hydrocarbon hydrogenation and/or dehydrogenation reactions, the process comprising:
    (a) providing a catalyst support comprising a mesoporous crystalline material combined with an amorphous binder;
    (b) treating the catalyst support with a phosphorus-containing anchoring material capable of bonding to the surface of the support and to a metal component;
    (c) depositing a precursor to said metal component on the surface of the catalyst support; and
    (d) subjecting the treated catalyst support having said precursor deposited thereon to conditions effective to convert said precursor to the metal component and to cause said phosphorus-containing anchoring material to bond to the surface of the support and to the metal component, thereby reducing sintering of the metal component in comparison to a catalyst produced without step (b), as indicated by an increase in oxygen chemisorption measured after step (d).

2. The process of claim 1, wherein the porous crystalline material is a silicate or an aluminosilicate.

3. The process of claim 1, wherein the mesoporous crystalline material is selected from the group consisting of MCM-41, MCM-48, MCM-50 and mixtures thereof.

4. The process of claim 1, wherein the amorphous binder is an inorganic oxide material.

5. The process of claim 1, wherein the phosphorus-containing anchoring material is selected from a phosphorus oxide, a phosphorus oxyacid, a phosphorus oxyhalide and mixtures thereof.

6. The process of claim 1 wherein the metal component comprises at least one metal selected from Groups 6 to 10 of the Periodic Table of Elements and compounds and mixtures thereof.

7. The process of claim 1, wherein the metal component comprises platinum, palladium and compounds and mixtures thereof.

8. The process of claim 1, wherein said precursor comprises a complex of said metal component.

9. The process of claim 1, wherein the depositing (c) is conducted by impregnation or ion exchange.

10. The process of claim 1, wherein the treating (b) and the depositing (c) are conducted simultaneously.

11. The process of claim 1, wherein (d) comprises heating the treated catalyst support in an oxygen-containing atmosphere to convert the precursor to an oxide of the metal component and then heating the treated catalyst support in an hydrogen-containing atmosphere to convert the oxide to the metal component.

12. The process of claim 1, wherein: the mesoporous crystalline material is selected from the group consisting of MCM-41, MCM-48, MCM-50, and mixtures thereof; the metal component comprises platinum and/or palladium; and the phosphorus-containing anchoring material is selected from a phosphorus oxide, a phosphorus oxyacid, a phosphorus oxyhalide, and mixtures thereof.

* * * * *